United States Patent Office 2,781,386
Patented Feb. 12, 1957

2,781,386

MANUFACTURING DRYING PAINTS

Karl Culemeyer, Hamburg-Langenfelde, Germany, assignor, by mesne assignments, to Willy Spangenberg & Co., Hamburg-Eidelstedt, Germany, a firm No Drawing. Application September 9, 1950,
Serial No. 184,115

3 Claims. (Cl. 260—410.9)

This invention relates to paints and methods of manufacturing the same.

An object of the present invention is to produce quickly drying paints and paint bases of high weather resistance.

Another object to improve the drying qualities of paints and paint bases containing tallic oil fatty esters which are generally insufficient due to the absence of linolenic acid and the high content of oleic acid in the fatty acids.

The term "tallic oil" is used throughout this specification to designate a liquid resin which is a waste product from the manufacture of cellulose from pine wood.

A further object is the production of a paint or paint base composition comprising tallic oil fatty acid esters, the acid components of the said esters being free of linolenic acid, whereby the tendency of such paints to yellow or tarnish is substantially obviated.

An additional object is the provision of paints which manifest enhanced characteristics with respect to waterproof properties and resistance to the effects of weathering.

Other objects of the present invention will become apparent in the course of the following specification.

Pursuant to the present invention it was found desirable to convert practically pure fatty acids and/or pure resin acids of tallic oil, obtained, for example, in the course of high vacuum distillation of raw tallic oil, with polymerization products, preferably vinyl polymerization products or vinyl compounds susceptible to polymerization by heating under the conditions involved in the preparation of tall oil fatty acid esters as described herein.

In accordance with the present invention, it has been found that novel paint bases manifesting improved characteristics with respect to drying properties, stability, and resistance to color variation, such as yellowing or tarnishing, as well as to the general consequences of weather exposure are attainable. Thus they may be produced from tallic oil, or components thereof, such as tallic oil distillates, pure tallic oil fatty acids, esters thereof, or condensation or polymerization products obtainable therefrom, as well as mixtures of these substances. In the preferred adaptation of the invention, tallic oil fatty acids resulting from the rectification of tallic oil under high vacuum conditions, are heated with an appropriate vinyl ester, preferably vinyl acetate, under controlled conditions. The reaction is preferably effected at a temperature of approximately 210° C., which is desirably in excess of the boiling temperature of the said vinyl ester reagent utilized. In its optimum embodiments, substantially equimolar proportions of the tallic oil fatty acid mixture and the vinyl ester, preferably vinyl acetate, are involved in the attendant reaction, as a result of which a paint base is prepared comprising a tallic oil fatty acid ester product manifesting enhanced drying characteristics.

Thus a lacquer may be prepared therefrom by embodying therein a siccative, and diluting or thinning the composition in accordance with the usual practice, the said lacquer affording excellent resistance to weathering and moisture, as above indicated. Upon "rubbing up" a lacquer product of the present invention with appropriate coloration in the form of a pigment, an improved paint composition is provided which is resistant to chalking and generally manifesting the aforesaid characteristics. Where white pigments are utilized, a significant color stability is afforded, substantially free from any yellowing tendency, notwithstanding exposure to adverse weather conditions, thereby obviating a shortcoming attributable to conventional white paint compositions.

The purport and essence of the invention will be found apparent from the following examples, given solely by way of illustration and not by way of limitation.

Example 500 kilograms of pure tallic oil fatty acids containing 96% oleic acid and linolenic acid, produced by rectification of tallic oil under a high vacuum, are converted and mixed with 150 kilograms vinyl acetate at 210° C. until no more acetic acid is passed. The molar ratio of vinyl acetate to tallic oil fatty acids, corresponding with the aforesaid specified amounts of the reagents, is somewhat in excess of 0.98, thus substantially approximating equimolar proportions. The vinyl ester which is thus produced constitutes a well drying oil which is treated by a siccative and diluted in the usual manner, whereby well drying paints of high weather resistance are obtained.

It is apparent that the above example has been given solely by way of illustration and not by way of limitation and that it is subject to wide variations and modifications within the scope of the present invention. All such variations and modifications are to be included within the scope of the present invention.

What is claimed is:

1. The process of manufacturing drying paint bases which comprises reacting at a temperature of approximately 210° C. a substantially pure tallic oil fatty acid mixture, produced by rectification of tallic oil under high vacuum, with vinyl acetate, the proportion of the vinyl acetate to the fatty acid mixture being approximately equimolar.

2. The process of manufacturing drying paint bases which comprises reacting at a temperature of approximately 210° C. a substantially pure tallic oil fatty acid mixture, produced by rectification of tallic oil under high vacuum, with vinyl acetate, the proportion of the vinyl acetate to the tallic oil fatty acid mixture corresponding with the amounts of 150 kilograms of vinyl acetate to 500 kilograms of the said tallic oil fatty acid mixture.

3. The process of manufacturing drying paints which comprises reacting at a temperature of approximately 210° C. a substantially pure tallic oil fatty acid mixture, produced by rectification of tallic oil under high vacuum, with vinyl acetate, the proportion of the vinyl acetate to the tallic oil fatty acid mixture being approximately equimolar, adding a siccative to the reaction product of the said tallic oil fatty acid mixture and vinyl acetate, thinning the resultant composition to any predetermined extent, and embodying therein a pigment.

References Cited in the file of this patent

UNITED STATES PATENTS

| | | |
|---|---|---|
| 2,214,784 | Wayne | Sept. 17, 1940 |
| 2,228,365 | Reppe | Jan. 14, 1941 |
| 2,278,674 | Segessemann | Apr. 7, 1942 |
| 2,299,862 | Toussaint | Oct. 27, 1942 |
| 2,352,547 | Jenkins | June 27, 1944 |
| 2,493,486 | Greenlee | Jan. 3, 1950 |
| 2,558,548 | Eckey | June 26, 1951 |